G. SEITZ.
Preparing Mash for Distillation.
No. 19,210. Patented Jan. 26, 1858.
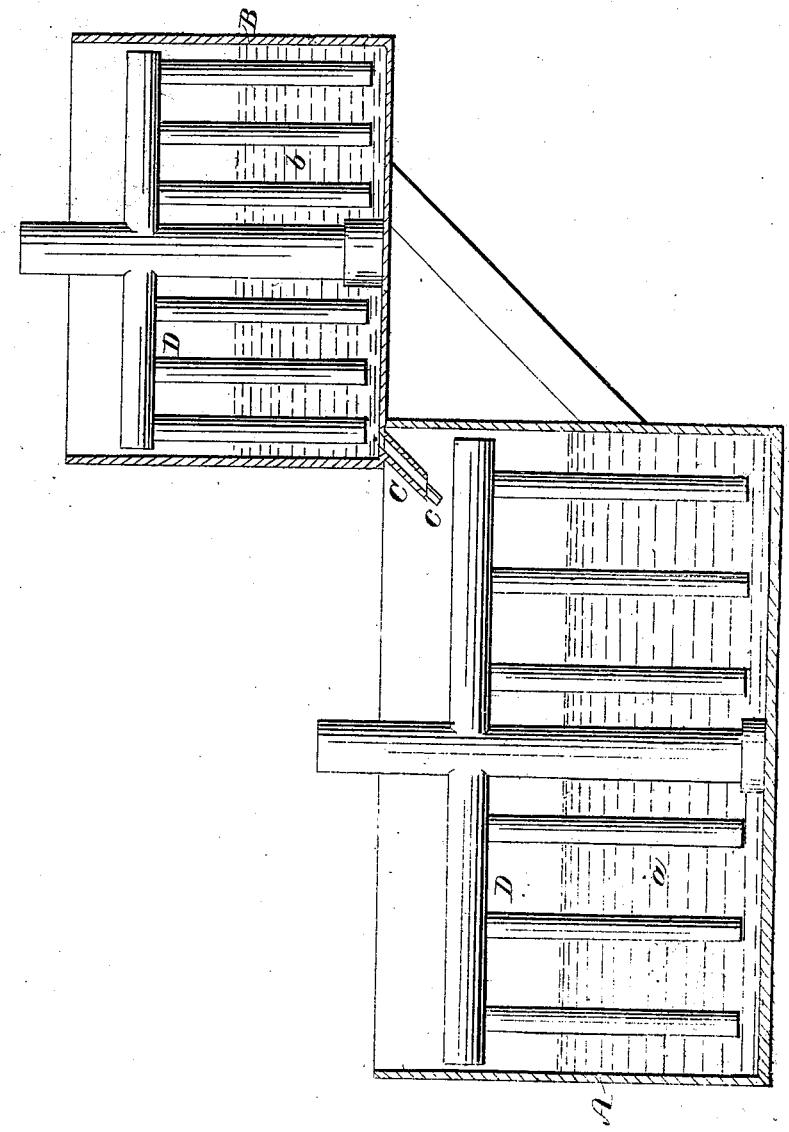

UNITED STATES PATENT OFFICE.

GEORGE SEITZ, OF EASTON, PENNSYLVANIA.

PREPARING MASH FOR DISTILLATION.

Specification of Letters Patent No. 19,210, dated January 26, 1858.

*To all whom it may concern:*

Be it known that I, GEORGE SEITZ, of Easton, in the county of Northampton, State of Pennsylvania, have invented a new and useful Improvement in Preparing Mash for Distillation; and I do hereby declare that the following is a full, clear, and exact description of the same, reference being had to the accompanying drawing, making a part of this specification, said drawing being a vertical central section of the mash tuns so arranged to carry out fully my invention.

The invention relates to an improvement in preparing mash from a mixture or combination of Indian corn or maize and rye or other grain either raw or malted. In the United States, maize being the staple, so far as grain is concerned, it is of course extensively used for the distilling of whisky, in fact, nearly if not all the whisky distilled in the country is from a mixture of maize and rye, the latter being either raw or malted or a portion in both states used; the quantity of maize, as a general thing, largely preponderating. The product of the spirits which the different grains afford depends mainly upon the quantity of starch they contain; the starch being converted into sugar by the gluten and diastase of the malt. Maize contains a large amount of starch but comparatively little gluten, and hence the necessity of mixing with it other grain, such as rye or barley, for instance, raw and malted, containing a requisite amount of gluten and diastase to saccharify its starch. At present the mash is prepared in one tun; the "corn chop," as it is technically termed, being first steeped in tepid water, and then gradually raised to 180° Fah., and upward, until a perfect decoction is obtained or its parts separated and forming a mucilaginous mass. The "rye chop" and malt are then added to saccharify the starch of the maize, and the fermenting process then commences. Indian corn or maize, owing to natural causes, requires to be subjected to considerable heat in order that its parts may be separated or its starch liberated. This degree of heat (180° + Fah.) is much too great for the "rye chop" or other grain and malt containing gluten, diastase and starch; said gluten and starch forming a stiff gum or substance of an insoluble nature which does not act efficiently upon the starch of the maize, or does not convert all its starch into sugar; and consequently distillers do not at present obtain all the alcohol contained in the grain. I propose to remedy this difficulty by employing two tuns and steeping the maize in one tun and the rye or other grain and malt in the other tun; the grain in each tun being subjected to the proper temperature for separating their parts, and the two decoctions then mixed. By this means all the starch the grain contains is saccharified and the whole amount of alcohol obtained.

In the drawing, A represents a mash tun, in which the "corn chop" (*a*) is placed; and B represents a tun for the "rye chop" (*b*); the tun B being placed above A, and at one side of it, and having a spout C, provided with a plug or faucet (*c*), which spout projects over A, as plainly shown in the drawing. A requisite quantity of water is placed in the tun A, the "corn chop" added, and the mass is gradually heated up, either by steam or the addition of hot water, to 180° Fah., or upward, as usual, until the parts of the maize are separated, and a mucilaginous mass is obtained. At the same time, the "rye chop" or other grain and malt possessing the necessary amount of gluten and diastase is placed in the tun B, which contains a requisite quantity of water, and this mass is subjected to a heat of about 130° Fah., the heat being gradual, which is sufficient to separate or dissolve its parts without injuriously affecting them. The mass in the tun B is then allowed to pass into the other tun A, and the whole of the starch contained in the mass in A, will be saccharified by the mass from B; the latter cooling the mass in A to a mean temperature of 155° Fah.—a temperature most favorable to the conversion of the starch into sugar. The mass is then allowed to cool, and the fermenting process commences; the subsequent treatment of the mash, as also the distilling process, being conducted in the usual way. I would remark that the tuns are of usual construction, and are provided with the ordinary revolving rakes D.

Having thus described my invention, what I claim as new and desire to secure by Letters Patent, is:

Steeping or infusing the maize and rye or other grain and malt separately, so that each may be subjected to the degree of temperature necessary for the proper separation or dissolution of their parts, and then uniting or mixing the two infusions substantially as and for the purpose herein set forth.

GEORGE SEITZ.

Witnesses:
  B. F. ARNOR,
  H. M. MITCHEL.